(12) United States Patent
Wang

(10) Patent No.: US 7,780,124 B2
(45) Date of Patent: Aug. 24, 2010

(54) SHRINKABLE AND ADJUSTABLE MULTI-FUNCTIONAL TV

(75) Inventor: Robert Wang, Taoyuan (TW)

(73) Assignee: Ceramate Technical Co., Ltd., Taoyuan (TW)

( * ) Notice: Subject to any disclaimer, the term of this patent is extended or adjusted under 35 U.S.C. 154(b) by 972 days.

(21) Appl. No.: 11/580,285

(22) Filed: Oct. 13, 2006

(65) Prior Publication Data

US 2008/0100996 A1    May 1, 2008

(51) Int. Cl.
*A47F 5/00* (2006.01)

(52) U.S. Cl. ............ 248/122.1; 248/918; 362/135; 361/679.22

(58) Field of Classification Search ............ 248/474, 248/282.1, 918, 919, 922, 923, 276.1, 283.1; 362/135, 141, 142, 143, 144; 361/679.02, 361/679.21
See application file for complete search history.

(56) References Cited

U.S. PATENT DOCUMENTS

| | | | | |
|---|---|---|---|---|
| 388,346 | A * | 8/1888 | Duff | 362/141 |
| 789,152 | A * | 5/1905 | Hasbrouck | 248/474 |
| 833,492 | A * | 10/1906 | Van Horn | 362/144 |
| 935,922 | A * | 10/1909 | Nelson | 359/854 |
| 1,105,039 | A * | 7/1914 | Olbon | 248/126 |
| 2,861,501 | A * | 11/1958 | Strelakos | 359/802 |
| 3,179,361 | A * | 4/1965 | O'Brien | 248/472 |
| 4,319,314 | A * | 3/1982 | Morton | 362/432 |
| 4,339,104 | A * | 7/1982 | Weidman | 248/407 |
| 4,651,966 | A * | 3/1987 | Suzuki | 248/674 |
| 4,824,159 | A * | 4/1989 | Fluharty et al. | 362/492 |
| 5,224,060 | A * | 6/1993 | Ma | 361/679.09 |
| 5,268,817 | A * | 12/1993 | Miyagawa et al. | 361/679.07 |
| 5,453,915 | A * | 9/1995 | Bradley, III | 362/144 |
| 6,273,585 | B1 * | 8/2001 | Wu | 362/135 |
| 6,441,969 | B1 * | 8/2002 | Goldstein et al. | 359/727 |
| 6,985,356 | B2 * | 1/2006 | Wang | 361/679.06 |
| 7,028,961 | B1 * | 4/2006 | Dittmer et al. | 248/278.1 |
| 7,048,406 | B1 * | 5/2006 | Shih | 362/135 |
| 7,248,463 | B2 * | 7/2007 | Bander et al. | 361/679.27 |
| 2003/0147208 | A1 * | 8/2003 | Kim | 361/683 |
| 2006/0098403 | A1 * | 5/2006 | Smith | 361/683 |
| 2007/0075195 | A1 * | 4/2007 | Chen et al. | 248/157 |

* cited by examiner

*Primary Examiner*—Kimberly T Wood
(74) *Attorney, Agent, or Firm*—Ming Chow; Sinorica, LLC

(57) ABSTRACT

A shrinkable and adjustable multi-functional TV includes a display, a support device, a shrinkable and angle adjusting device. The display has a mirror on its rear side, and an LCD screen on a front side, pivotally received in an interior of a U-shaped frame of the support device and by means of a tightening button respectively threadably combined with two sides of the U-shaped frame and with two sides of the display so that the display can be turned for an angle and also turned over. The support device has its lower end pivotally connected with a first free end of the shrinkable and angle adjusting device, which has its second end pivotally connected to a suspended arm base fixed on a wall, a foot frame or a chair. Thus the TV can be shrunk for altering its viewing angle and position.

2 Claims, 4 Drawing Sheets

SHRINKABLE AND ADJUSTABLE MULTI-FUNCTIONAL TV

BACKGROUND OF THE INVENTION

1. Field of the Invention

This invention relates to a TV, particularly provided with an LCD screen on a front side of a display and a mirror on a rear side of the display, and its viewing angle adjustable and with the display possible to be turned over so that the mirror can be altered to be located at the front side and used. Moreover, the display can be adjusted to move nearer to a wall surface where the TV is supported by a suspended arm base fixed on the wall surface and pivotally combined with a shrinkable and angle adjusting device (or the suspended arm).

2. Description of the Prior Art

Nowadays, an LCD TV has become popular, as they have a lightweight and little radiation. A conventional LCD TV shown in FIG. 1 is composed of an LCD screen 1, a frame 2 and a support base 3. The LCD screen 1 is fitted in preset grooves of the frame 2, which is then pivotally connected to the support base 3, permitting the LCD TV to sit on a table.

However, the conventional LCD TV has only one viewing angle, as the screen 1 is positioned immovable, hardly satisfying various viewing angles of consumers.

SUMMARY OF THE INVENTION

This invention has been devised to offer a shrinkable and adjustable multi-functional TV.

The features of the invention are a display, a support device, and a shrinkable and angle adjustable device. The display has an LCD screen on its front side, and a mirror on its rear side, pivotally supported in an interior of a U-shaped frame of the support device, so the display can be turned for an angle and also turned over to use the LCD screen or the mirror optionally by means of a tightening button respectively combining the two sides of the U-shaped frame with two sides of the display. The U-shaped frame has its lower side pivotally connected to a first free end of the shrinkable and angle adjustable device (or a suspended arm), which has a second end pivotally connected to a suspended arm base by a tubular member, with the suspended arm base fixed on a wall surface. Then the shrinkable and angle adjusting device enables the distance between the display and the wall surface shrunk or expanded and the viewing angle altered. The mirror is also added with a switch for turning it on or off.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
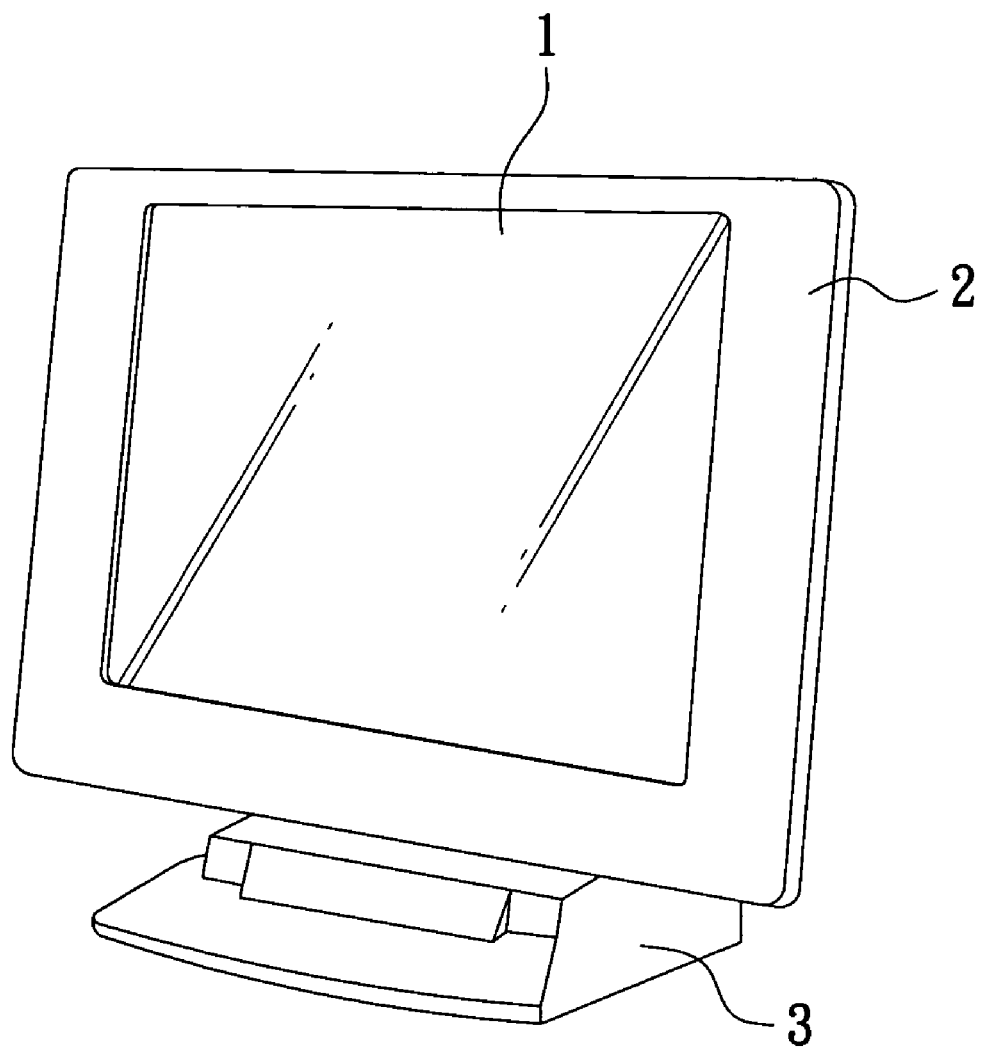
FIG. 1 is a perspective view of a conventional LCD TV.
Figure 2:
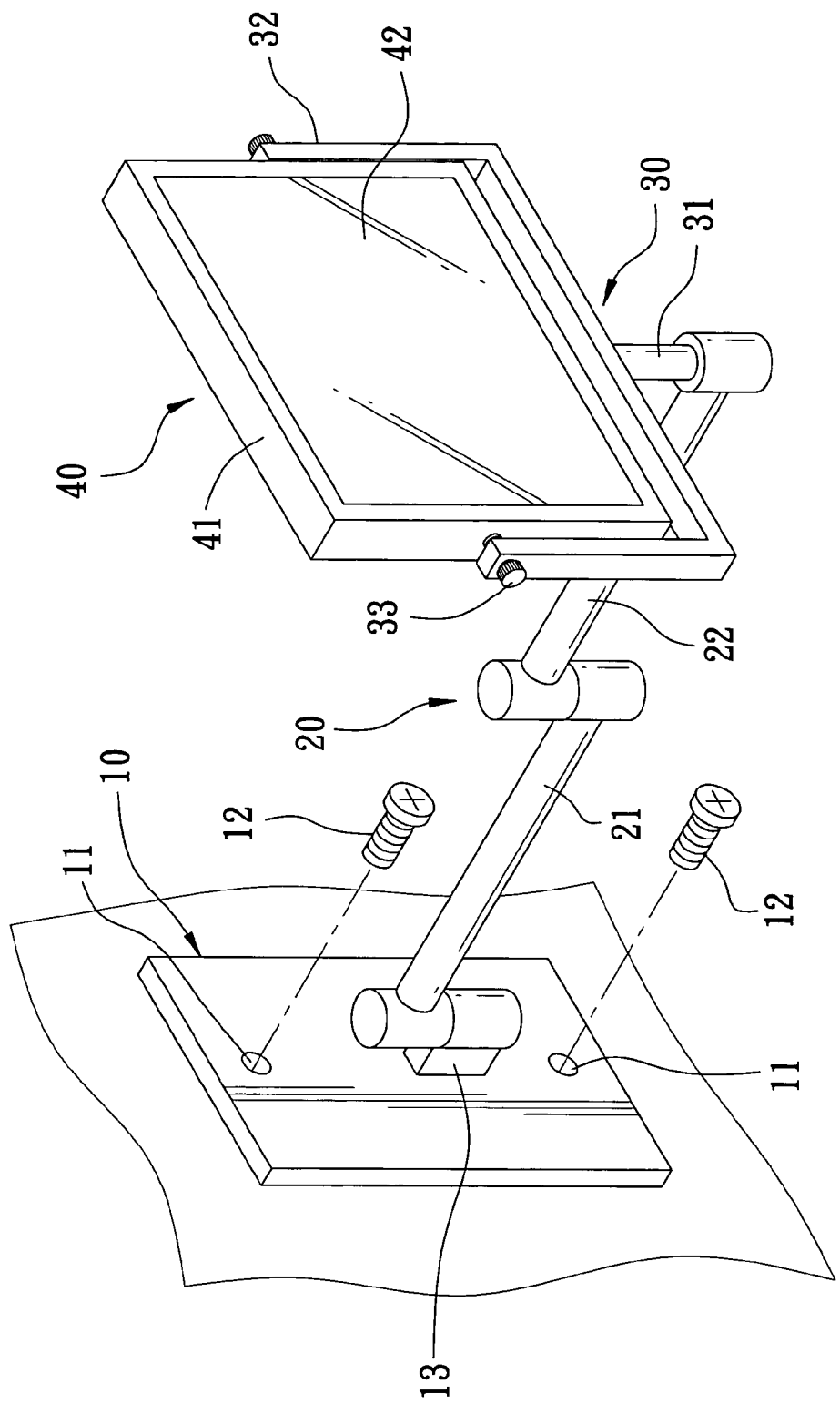
FIG. 2 is an exploded perspective view of a shrinkable and adjustable multi-functional TV in the present invention.
Figure 3:
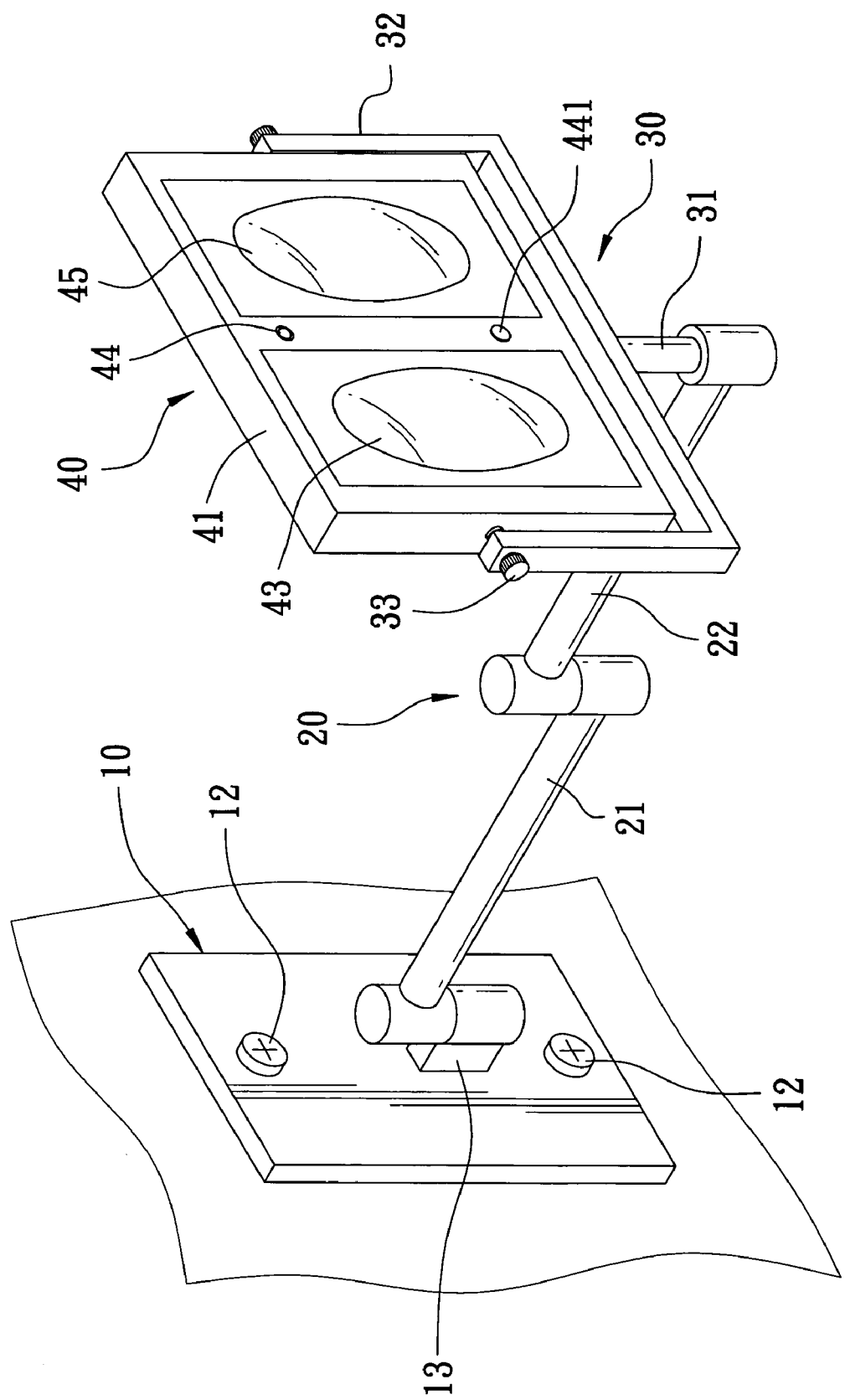
FIG. 3 is a perspective view of the first embodiment of an LCD TV in the present invention, showing it with the rear side of the screen turned over to face the front side; and, FIG. 4 is a perspective view of a second embodiment of a shrinkable and adjustable multi-functional TV in the present invention.

A first embodiment of a shrinkable and adjustable multi-functional TV with two side screens, as shown in FIGS. 2 and 3, includes a suspending arm base 10, a shrinkable and angle adjusting device (or a suspended arm) 20, a support device 30, and a display 40 as main components combined together.

The suspending arm base 10 is provided with plural fasten holes 11 at preset locations, plural fasten elements 12 crewing with the fasten holes 11 respectively and further threadably moving in a wall, and a tubular base 13 is fixed on an intermediate surface of the suspending arm base 10.

The shrinkable angle adjusting device (or a suspended arm) 20 consists of a first arm 21 and a second arm 22, and the first arm 21 has a first end pivotally connected to the tubular base 13, and a second end pivotally connected to a first end of the second arm 22.

The support device 30 is composed of an upright support arm 31 and a U-shaped frame 32. The upright support arm 31 has its lower end pivotally connected to a second end of the second arm 22, and its upper end fixed with an intermediate portion of a lower side of the U-shaped frame 32. The U-shaped frame 32 has two parallel upright sides with their upper end provided threadably with a tightening button 33.

The display 40 is pivotally combined inside the U-shaped frame 32, with two side walls threadably combined with the tightening buttons 33, composed of a frame 41, an LCD screen 42 positioned on a front surface, a mirror 43, a convex lens 45 and a lighting member 44 with a switch 441 positioned on a rear surface. The lightening member 44 is an LED.

Next, as shown in Figs, the display 40 is pivotally fitted in the U-shaped frame 32 of the support device 30, so it is possible to be easily turned over together with the U-shaped frame 32 to let the LCD screen on the front surface of the display 40 interchange with the mirror 43 on the rear surface of the display 40 for viewing by means of the two fastening buttons 33, in addition to the viewing angle of the display 40 able also to be adjusted by pushing with the fastening buttons 33 functioning as pivots. Moreover, the angle between the first arm 21 and the second arm 22 of the shrinking and angle adjusting device 20 can be altered, lengthening or shrinking the distance between the suspended arm base 10 and the display 40 also possible to be altered in its angle and location. If the mirror 43 is to be used, the display 40 is turned over for 180 degrees, and if the light is too dim, the switch 441 can be turned on to light up the lightening member 44.

Figure 4:
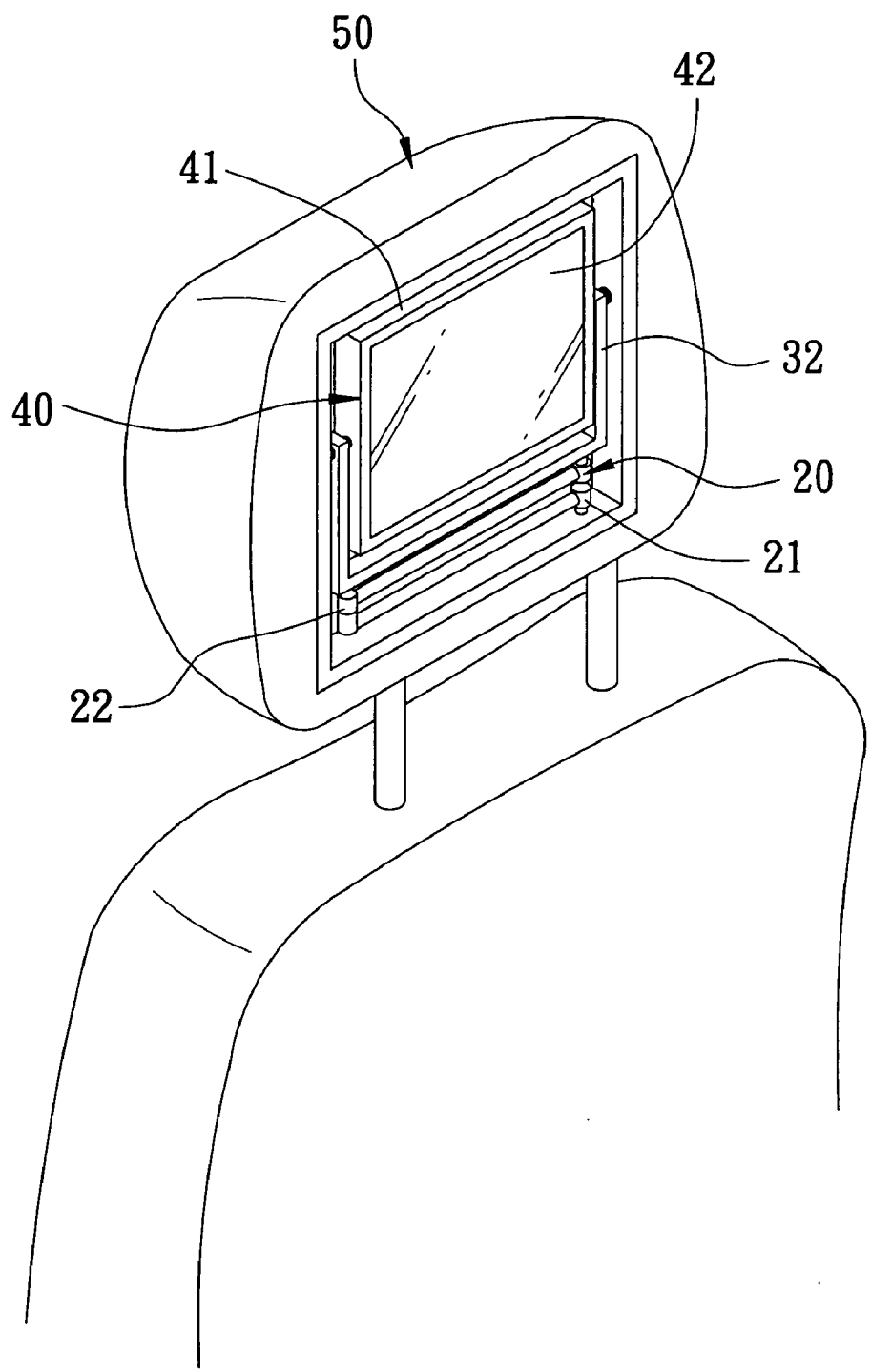

Next, FIG. 4 shows a second embodiment of a shrinkable and adjustable multi-functional TV, which is to be combined with a headrest 50 of a chair of an automobile, by the second end of the first arm 21 pivotally connected in the headrest 50, with the second arm 22 and the suspended arm base 10 not needed. Then when the multi-functional TV is not to be used, it can be shrunk and hidden in the headrest 50, and pulled out of the headrest 50 to the preset location in case it is to be used.

As can be understood from the foresaid description, the invention has an advantage that the rear side of the screen can be fitted with the mirror 43 and the lightening member 441 for watching TV or for making up, with the angle and the location of the LCD screen 42 or the mirror 43 adjustable for convenience of watching.

While the preferred embodiments have been described above, it will be recognized and understood that various modifications may be made therein and the appended claims are intended to cover all such modifications that may fall within the spirit and scope of the invention.

What is claimed is:

1. A shrinkable and adjustable multi-functional TV comprising:

a suspended arm base being fixed at a position of a wall surface;

a shrinkable-and-angle-adjustable device having a first arm and a second arm;

a first end of the first arm being pivotally connected to said suspended arm base;

a second end of the first arm being pivotally connected to a first end of the second arm;

a second end of the second arm being pivotally connected to a support device;

the support device comprises of an upright support arm and a U-shaped frame;

an upper end of the upright support being fixed with an intermediate portion of a lower side of the U-shaped frame;

a display being pivotally received in an interior of said U-shaped frame;

two side walls of the display being threadable combined with the U-shaped frame by tightening buttons;

an LCD screen being fitted on a front surface of said display; and a mirror and a lightening element being fitted on a rear surface of said display.

2. The shrinkable and adjustable multi-functional TV as claimed in claim 1, wherein said lightening element is an LED, and a switch is connected with said LED for turn it on or off.

* * * * *